(12) United States Patent
Kirsch et al.

(10) Patent No.: US 12,209,823 B2
(45) Date of Patent: Jan. 28, 2025

(54) HEAT EXCHANGER HEADER STRUCTURES

(71) Applicant: Hamilton Sundstrand Corporation, Charlotte, NC (US)

(72) Inventors: Kathryn L. Kirsch, Manchester, CT (US); Robert H. Dold, Monson, MA (US); Paul Attridge, Colchester, CT (US); Alexandru Cadar, Eastford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 125 days.

(21) Appl. No.: 17/581,571

(22) Filed: Jan. 21, 2022

(65) Prior Publication Data

US 2023/0235976 A1    Jul. 27, 2023

(51) Int. Cl.
*F28F 9/02*       (2006.01)
*B33Y 10/00*      (2015.01)
*B33Y 80/00*      (2015.01)

(52) U.S. Cl.
CPC .............. *F28F 9/026* (2013.01); *B33Y 10/00* (2014.12); *B33Y 80/00* (2014.12)

(58) Field of Classification Search
CPC .......... F28F 9/026; F28F 9/027; F28F 9/0246; F28F 9/0275; F28F 2210/02
See application file for complete search history.

(56) References Cited

U.S. PATENT DOCUMENTS

| | | | | |
|---|---|---|---|---|
| 2,762,635 A * | 9/1956 | Lorber | .................. | F28F 9/0275 |
| | | | | 285/136.1 |
| 3,205,939 A * | 9/1965 | Huet | .................. | F22B 1/16 |
| | | | | 976/DIG. 198 |
| 3,374,832 A * | 3/1968 | Tucker | .................. | F15D 1/001 |
| | | | | 165/173 |
| 7,665,956 B2 * | 2/2010 | Mitchell | .................. | F01D 5/182 |
| | | | | 415/115 |
| 8,181,943 B2 | 5/2012 | Leister et al. | | |
| 10,584,922 B2 * | 3/2020 | Herring | .................. | F28D 7/0008 |
| 10,670,349 B2 | 6/2020 | Wilson et al. | | |
| 11,209,222 B1 * | 12/2021 | Colson | .................. | B33Y 80/00 |
| 11,268,770 B2 * | 3/2022 | Ruiz | .................. | F28F 9/0268 |

(Continued)

FOREIGN PATENT DOCUMENTS

EP   0040748 A1   12/1981
EP   2570749 A1   3/2013

(Continued)

OTHER PUBLICATIONS

Extended European Search Report issued by Examiner Celia Rico Martinez, of the European Patent Office, mailed on May 16, 2023, in corresponding European Patent Application No. 23152946.2.

(Continued)

*Primary Examiner* — Nelson J Nieves
(74) *Attorney, Agent, or Firm* — Bachman & LaPointe, P.C.

(57) ABSTRACT

In accordance with at least one aspect of this disclosure, a transition structure for a heat exchanger can include a body defining a dome cavity. The dome cavity can be configured to transition flow between at least one first channel and a plurality of second channels having a different number than the at least one first channel.

16 Claims, 5 Drawing Sheets

(56) References Cited

U.S. PATENT DOCUMENTS

| | | | |
|---|---|---|---|
| 11,274,886 B2* | 3/2022 | Becene | F28D 7/024 |
| 11,359,864 B2* | 6/2022 | Becene | B33Y 10/00 |
| 11,396,069 B2* | 7/2022 | Norman | B23P 15/26 |
| 11,493,286 B1* | 11/2022 | Kirsch | B33Y 80/00 |
| 11,666,994 B2* | 6/2023 | Norman | B23P 15/26 |
| | | | 165/173 |
| 2013/0206374 A1* | 8/2013 | Roisin | F28D 7/0041 |
| | | | 165/165 |
| 2015/0000332 A1* | 1/2015 | Michitsuji | F24F 1/0063 |
| | | | 62/525 |
| 2017/0089643 A1* | 3/2017 | Arafat | F28D 9/0037 |
| 2017/0248372 A1* | 8/2017 | Erno | F28F 13/06 |
| 2017/0266583 A1* | 9/2017 | Crayssac | F28F 9/0278 |
| 2017/0328644 A1 | 11/2017 | Takahashi | |
| 2017/0328653 A1* | 11/2017 | O'Coin | F25B 39/00 |
| 2018/0283795 A1* | 10/2018 | Cerny | F28F 1/12 |
| 2019/0024988 A1 | 1/2019 | Wilson et al. | |
| 2020/0284532 A1* | 9/2020 | Becene | F28F 9/0275 |
| 2021/0102756 A1 | 4/2021 | Becene et al. | |
| 2023/0407791 A1* | 12/2023 | Toubiana | F28D 9/0006 |

FOREIGN PATENT DOCUMENTS

| | | |
|---|---|---|
| EP | 3705828 A1 | 9/2020 |
| EP | 3825638 A1 | 5/2021 |
| EP | 4166888 A1 | 4/2023 |
| JP | 07103502 A * | 4/1995 |

OTHER PUBLICATIONS

Office Action dated Jun. 12, 2024 issued in corresponding application EP23152946.2.

* cited by examiner

HEAT EXCHANGER HEADER STRUCTURES

STATEMENT OF GOVERNMENT RIGHTS

This invention was made with government support under contract no. DE-AR0001121 awarded by the U.S. Department of Energy. The government has certain rights in the invention.

FIELD

This disclosure relates to heat exchangers, e.g., for aerospace applications.

BACKGROUND

Heat exchangers are central to numerous systems in engines and power cycles. Applications such as recuperators and waste heat recovery heat exchangers continually require increases in heat transfer performance, reductions in pressure loss, and reductions in size and weight. Furthermore, the operating pressures and temperatures of these heat exchangers become more demanding as the target system efficiency is increased.

Designing these heat exchangers to survive these high temperature and ultra-high pressure conditions while keeping the heat exchangers compact is challenging. Furthermore, integrating these compact heat exchangers within a given system requires connecting the heat exchanger core, which can contain hundreds to thousands of channels, to external plumbing, which generally demands intricate header topologies that must withstand the ultra-high operating pressure of the cycle. Additive manufacturing (AM) offers an ability to create such topologies, but further constraining the design by buildability adds an extra layer of complexity.

Such conventional methods and systems have generally been considered satisfactory for their intended purpose. However, there is still a need in the art for improved heat exchanger headers. The present disclosure provides a solution for this need.

SUMMARY

In accordance with at least one aspect of this disclosure, a transition structure for a heat exchanger can include a body defining a dome cavity. The dome cavity can be configured to transition flow between at least one first channel and a plurality of second channels having a different number than the at least one first channel.

The at least one first channel can be a single first channel in fluid communication with the dome cavity. The single first channel can have an inner diameter that is the same as the diameter of the dome cavity.

The plurality of second channels can be two or more second channels. Each channel can have a second channel opening in fluid communication with the dome cavity.

In certain embodiments, the plurality of second channels includes nine second channels. Each second channel can extend from the body and become parallel with the other second channels. The nine second channels can be arranged in a three by three square. In certain embodiments, each second opening can define a center axis that is coincident with a center point of the dome cavity.

In accordance with at least one aspect of this disclosure, a heat exchanger header can include one or more transition structures. The one or more transition structures can be and/or include any suitable transition structure disclosed herein, e.g., as described above. In certain embodiments, the one or more transition structures can include a plurality of transition structures. In certain embodiments, the plurality of transition structures can include a plurality of successive transition structures of reducing size toward a core direction. For example, a dome cavity of a smaller transition structure can be in fluid communication with one of a respective second channel of a larger transition structure.

In accordance with at least one aspect of this disclosure, a method for additively manufacturing a heat exchanger can include building a transition structure comprising a body defining a dome cavity that is configured to transition flow between at least one first channel and a plurality of second channels having a different number than the at least one first channel. Building the transition structure can include building the dome cavity such that a vertical build direction is parallel with a center axis of the dome cavity and/or aligned with each second channel to build the transition structure without support structure.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
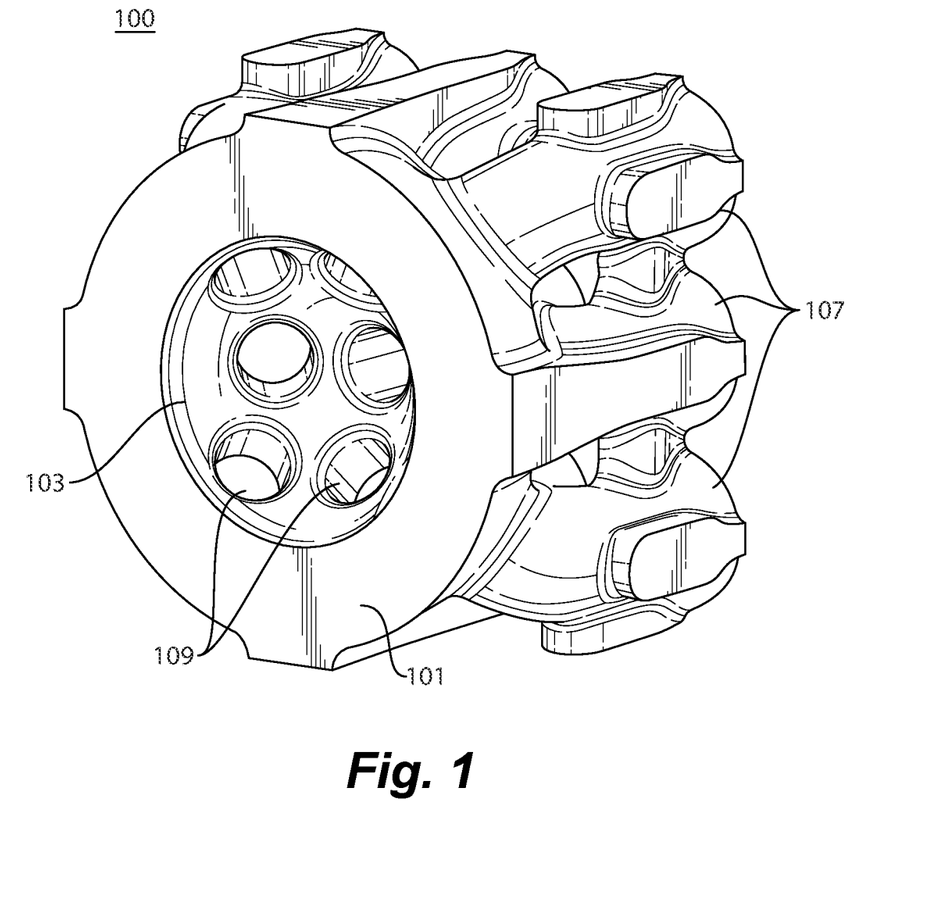
FIG. 1 is a is a perspective view of an embodiment of a transition structure in accordance with this disclosure, showing a dome cavity side.

Reference will now be made to the drawings wherein like reference numerals identify similar structural features or aspects of the subject disclosure. For purposes of explanation and illustration, and not limitation, an illustrative view of an embodiment of a transition structure in accordance with the disclosure is shown in FIG. 1 and is designated generally by reference character 100. Other embodiments and/or aspects of this disclosure are shown in FIGS. 2-5. Certain embodiments described herein can be used to provide efficient and strong heat exchanger headers for high pressure applications.

Figure 2:
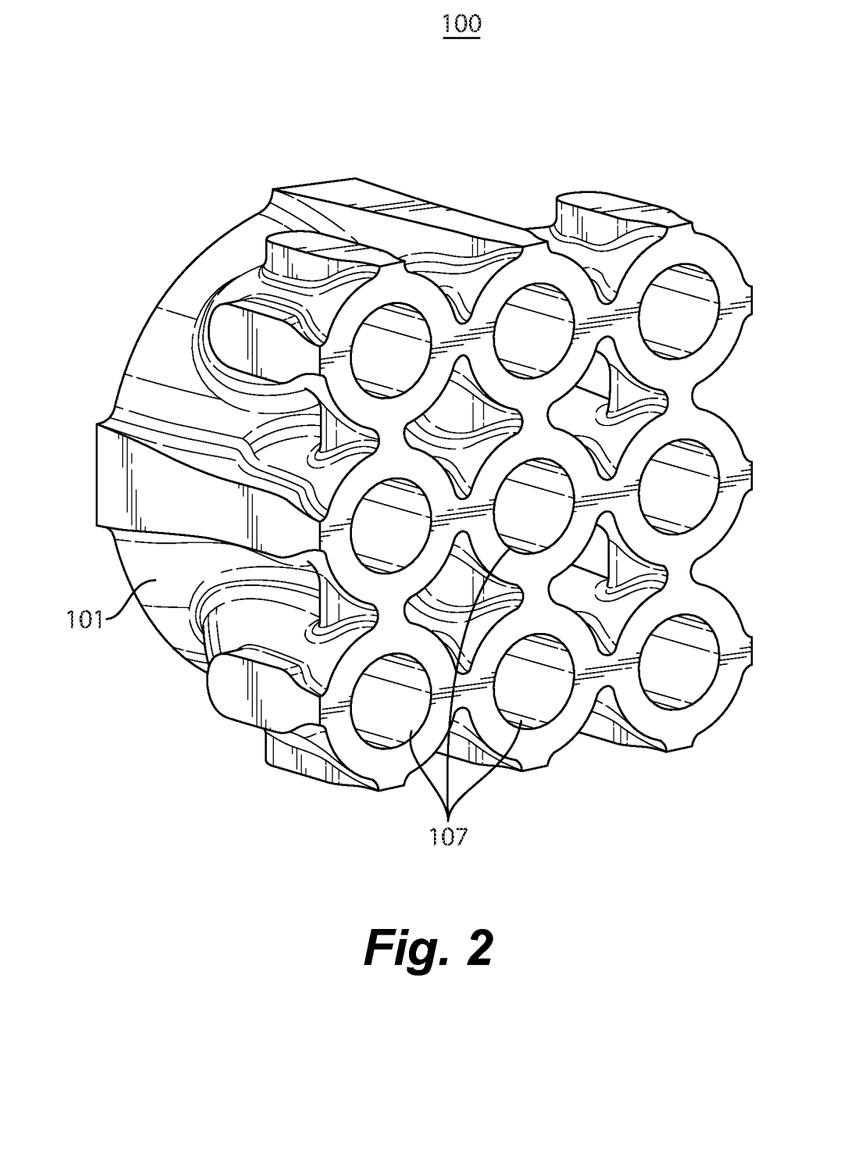
FIG. 2 is another perspective view of the embodiment of FIG. 1, showing a second channel side.
Figure 3:
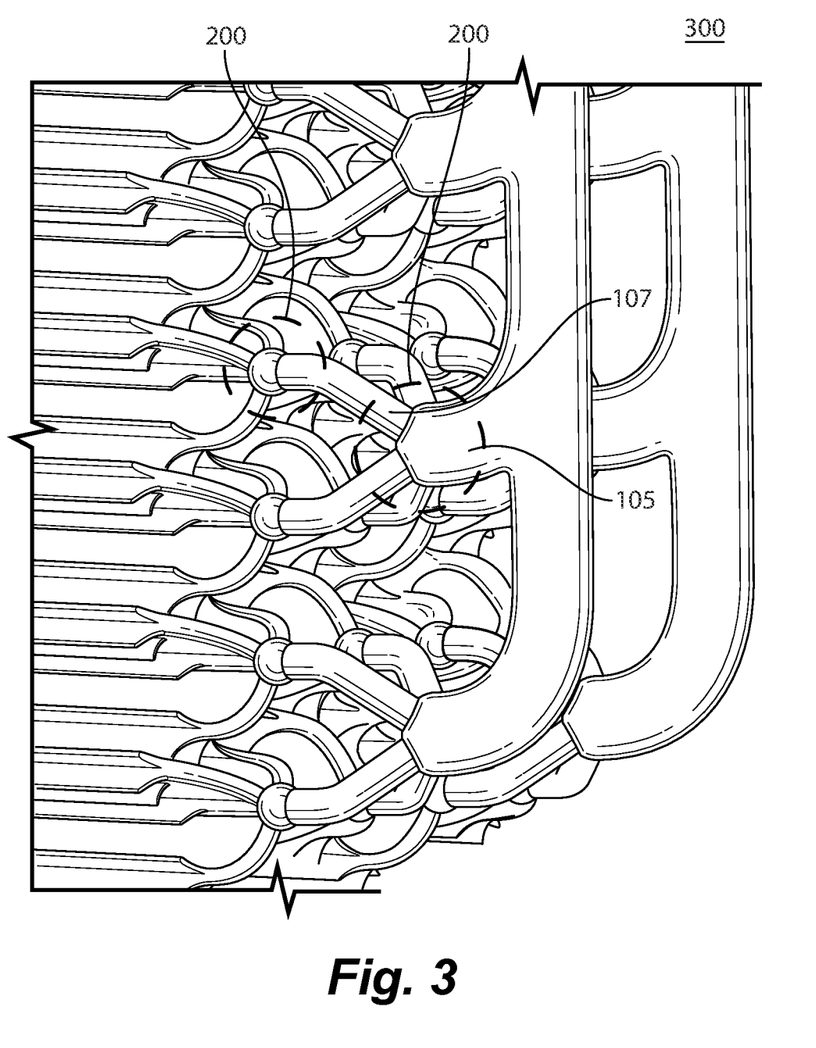
FIG. 3 is a partial perspective view of an embodiment of a header for a heat exchanger in accordance with this disclosure, showing locations where embodiments of a transition structure can be located.

Referring to FIGS. 1 and 2, a transition structure 100 for a heat exchanger (not shown) can include a body 101 defining a dome cavity 103. The dome cavity 103 can be hemispherical (e.g., as shown in FIGS. 1, 2, 4, and 5), partially spherical, or any other suitable ellipsoidal shape. Referring additionally to FIG. 3, the dome cavity 103 can be configured to transition flow between at least one first channel 105 and a plurality of second channels 107 having a different number than the at least one first channel 105.

The at least one first channel 105 can be a single first channel 105 in fluid communication with the dome cavity 103. The single first channel 105 can have an inner diameter that is the same as the diameter of the dome cavity 103. Any other suitable relative diameter and/or shape between the first channel 105 and the dome cavity 103 is contemplated herein.

The plurality of second channels 107 can be two or more second channels 107. Each channel 107 can have a second channel opening 109 in fluid communication with the dome cavity 103.

In certain embodiments, the plurality of second channels 107 can include nine second channels 107. Any suitable number of second channels 107 is contemplated herein. As shown in FIG. 3, the transition structures 200 can include four second channels, for example. Transition structure 200 can be otherwise similar to structure 100, for example.

Each second channel 107 can extend from the body 101 and become parallel with the other second channels 107 (e.g., as shown in FIG. 2). The second channels 107 can extend from the dome cavity at one or more angles and bend back to be parallel, for example. In certain embodiments, the second channels 107 can be limited to be no more than about 40 to 45 degrees to be self-supporting in build during additive manufacturing. For example, the build direction can be parallel with the centerline axes of the second channels, e.g., as shown. Any suitable number is contemplated. Any other suitable method of manufacturing is contemplated herein (e.g., lost wax casting or any other suitable method).

The nine second channels 107 can be arranged in a three by three square (e.g., as shown in FIG. 2). In certain embodiments, each second opening 109 can define a center axis (e.g., orthogonal to the plane defining the opening 109) that is coincident with a center point (e.g., such that all normal lines of each opening 109 extend through a center point of the theoretical full sphere from which the hemisphere comes) of the dome cavity 103. Any other suitable relationship between one or more center axes of the second openings 109 and the center point of the dome cavity 103 is contemplated herein.

Figure 4:
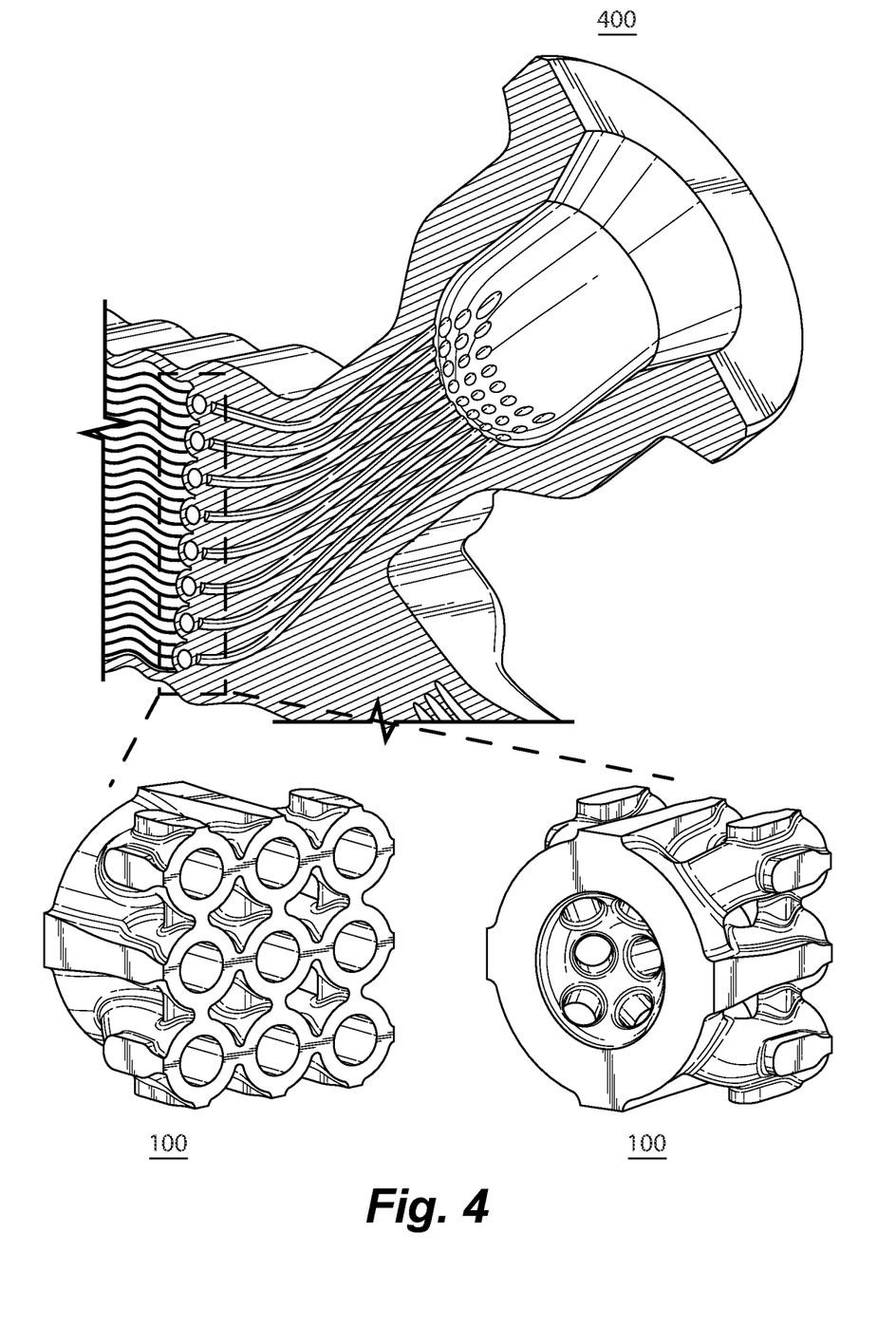
FIG. 4 is a partial cross-sectional view of an embodiment of header in accordance with this disclosure, showing the location of transition structures in accordance with this disclosure.
Figure 5:
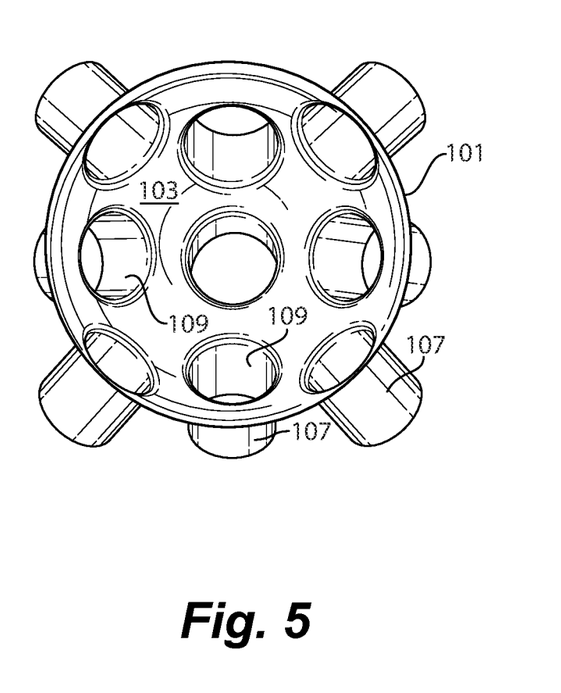
FIG. 5 is a elevation view of the embodiment of FIG. 1.

In accordance with at least one aspect of this disclosure, as shown in FIGS. 3 and 4, a heat exchanger header 300, 400 can include one or more transition structures. The one or more transition structures can be and/or include any suitable transition structure disclosed herein, e.g., structure 100 as described above. In certain embodiments, the one or more transition structures 100 can include a plurality of transition structures 100. In certain embodiments, the plurality of transition structures 100 can include a plurality of successive transition structures 100 of reducing size toward a core direction. For example, a dome cavity 103 of a smaller transition structure can be in fluid communication with one of a respective second channel of a larger transition structure. Embodiments of a header can include any suitable number of sub-divisions to transition from an inlet/outlet into the suitable number of core channels.

In accordance with at least one aspect of this disclosure, a method for additively manufacturing a heat exchanger can include building a transition structure comprising a body 101 defining a dome cavity 103 that is configured to transition flow between at least one first channel 105 and a plurality of second channels 107 having a different number than the at least one first channel 105. The transition structure can be and/or include any suitable transition structure disclosed herein, e.g., structure 100 as described above. Building the transition structure 100 can include building the dome cavity 103 such that a vertical build direction is parallel with a center axis of the dome cavity 103 and/or aligned with each second channel 107 to build the transition structure 100 without support structure. The method can include any other suitable method(s) and/or portion(s) thereof. Any other suitable method to make one or more embodiments of this disclosure is contemplated herein.

Embodiments can use a spherical shape in transition portions to handle high stresses with thinner walls. Stress in high pressure can be well distributed in the embodiment of a structure 100. The spacing of openings 109 apart from each other can be spaced out evenly so stresses are substantially the same throughout the cavity 103.

By providing a stronger structure, the weight of the overall heat exchanger can be reduced. In certain embodiments, each step down from larger flow channels to multiple smaller flow channels, the walls can be thinner. Embodiments also promote even flow to all the second channels or vice versa. The direction of flow can be either way and embodiments can provide a strong transition. In certain embodiments, the dome cavity can be positioned in the direction of flow. Embodiments can be built using additive manufacturing without support structure.

Embodiments can include an integrated heat exchanger header for ultra-high pressure operation with a modular design that provides a low-stress option for transitioning the flow from one channel into many (or vice versa). Embodiments can utilize spherical and cylindrical shapes to minimize pressure stresses due to the high pressure at flow transitions. For example, flow from one branch can enter a hemisphere from which several smaller channels emanate. Embodiments can include one flow path splits into nine channels for example. Alternatively, the flow can enter the nine smaller channels and converge to one flow path. Any other suitable number of channels are contemplated herein.

The diameter of the sphere can be modified to accommodate any number of splits. For example, the flow path can be split into four channels at two locations in the heat exchanger header, e.g., as shown in FIG. 3. Embodiments of a spherical transition can be easily scaled to create modular, fractal-like flow paths that continue to split one flow path into many in a way that ensures stress from ultra-high pressure operation remains low.

Embodiments can offer an integrated header design that seamlessly transitions between heat exchanger core and external system plumbing, survives an ultra-high pressure environment, and can be additively manufactured without internal supports. Embodiments can enable a modular, spherical transition path for ultra-high pressure fluid to split or converge while traveling through an additively manufactured heat exchanger. The flow can easily split into many smaller paths by way of hemispherical features. Alternatively, the flow can converge from multiple paths into one through the same feature, for example. Where previous designs for headers have relied on the merging and splitting of channels, often in discrete, stacked layers, to connect external plumbing to heat exchanger cores, embodiments can route circular paths through hemispherical transition paths such that stresses from ultra-high pressure loads remain low. As such, the resulting header performs well in ultra-high pressure applications. Furthermore, embodiments can be additively manufactured without the need for internal supports. Embodiments can inherently allows for patterning of the feature, which eases the CAD burden inherent in connecting hundreds to thousands of channels to one inlet or outlet. The cylindrical and spherical geometry can also be less computational intensive for the CAD program than current lofted designs, reducing file size and improving CAD rebuild times.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A transition structure for a heat exchanger, comprising:
    a body defining a dome cavity that is configured to transition flow between at least one first channel and a plurality of second channels having a different number than the at least one first channel, wherein the at least one first channel is a single first channel in fluid communication with the dome cavity, and wherein the single first channel has an inner diameter that is the same as the diameter of the dome cavity.

2. The transition structure of claim 1, wherein the plurality of second channels is two or more second channels, each channel having a second channel opening in fluid communication with the dome cavity.

3. The transition structure of claim 2, wherein the plurality of second channels includes nine second channels.

4. The transition structure of claim 3, wherein each second channel extends from the body and becomes parallel with the other second channels.

5. The transition structure of claim 3, wherein the nine second channels are arranged in a three by three square.

6. The transition structure of claim 2, wherein each second channel opening defines a center axis that is coincident with a center point of the dome cavity.

7. A heat exchanger header, comprising:
    one or more transition structures comprising a body defining a dome cavity that is configured to transition flow between at least one first channel and a plurality of second channels having a different number than the at least one first channel, wherein the at least one first channel is a single first channel in fluid communication with the dome cavity, and wherein the single first channel has an inner diameter that is the same as the diameter of the dome cavity.

8. The header of claim 7, wherein the plurality of second channels is two or more second channels, each channel having a second channel opening in fluid communication with the dome cavity.

9. The header of claim 8, wherein the plurality of second channels includes nine second channels.

10. The header of claim 9, wherein each second channel extends from the body and become parallel with the other second channels.

11. The header of claim 9, wherein the nine second channels are arranged in a three by three square.

12. The header of claim 8, wherein each second channel opening defines a center axis that is coincident with a center point of the dome cavity.

13. The header of claim 7, wherein the one or more transition structures includes a plurality of transition structures.

14. The header of claim 13, wherein the plurality of transition structures includes a plurality of successive transition structures of reducing size toward a core direction, wherein a dome cavity of a smaller transition structure is in fluid communication with one of a respective second channel of a larger transition structure.

15. A method for additively manufacturing a heat exchanger, comprising:
    building a transition structure comprising a body defining a dome cavity that is configured to transition flow between at least one first channel and a plurality of second channels having a different number than the at least one first channel, wherein the at least one first channel is a single first channel in fluid communication with the dome cavity, and wherein the single first channel has an inner diameter that is the same as the diameter of the dome cavity.

16. The method of claim 15, wherein building the transition structure includes building the dome cavity such that a vertical build direction is parallel with a center axis of the dome cavity and/or aligned with each second channel to build the transition structure without support structure.

* * * * *